United States Patent [19]
Inoue

[11] Patent Number: 6,085,974
[45] Date of Patent: Jul. 11, 2000

[54] CARD TERMINAL APPARATUS INCLUDING CARD INSERTION ASSEMBLY AND USER INTERFACE ASSEMBLY WHEREIN THE USER INTERFACE ASSEMBLY IS LOADED ON THE CARD INSERTION ASSEMBLY IN A PLURALITY OF POSITIONS

[75] Inventor: Atsuhiro Inoue, Kawasaki, Japan

[73] Assignee: Fujitsu Limited, Kawasaki, Japan

[21] Appl. No.: 09/009,926

[22] Filed: Jan. 21, 1998

[30] Foreign Application Priority Data

Jun. 16, 1997 [JP] Japan ................................. 9-158683

[51] Int. Cl.[7] .......................................................... G06K 5/00
[52] U.S. Cl. ......................................... 235/380; 235/472.01
[58] Field of Search .................................... 361/679, 680, 361/681; 235/380, 462.43, 462.45, 472.01

[56] References Cited

U.S. PATENT DOCUMENTS

| | | | |
|---|---|---|---|
| 5,532,466 | 7/1996 | Konno et al. | 235/472 X |
| 5,608,603 | 3/1997 | Su | 361/680 X |
| 5,679,943 | 10/1997 | Schultz et al. | 235/472 |
| 5,680,633 | 10/1997 | Koenck et al. | 361/680 X |

*Primary Examiner*—Karl D. Frech
*Attorney, Agent, or Firm*—Armstrong, Westerman, Hattori, McLeland & Naughton

[57] ABSTRACT

A card insertion portion is provided for a card to be inserted therein. A card reading and writing unit performs information reading from and writing in the card which has been inserted into the card insertion portion. A first assembly has the card insertion portion and the card reading and writing unit at one end side thereof. A second assembly has an input key portions, and a display portion at one end side thereof. The first assembly has a second-assembly loading portion adjacent to the card insertion portion. The second assembly is loaded on the second-assembly loading portion in either one of two positions, a first position being a position in which the card insertion portion is adjacent to the display portion, a second position being a position in which the card insertion portion is adjacent to the input key portions.

21 Claims, 11 Drawing Sheets

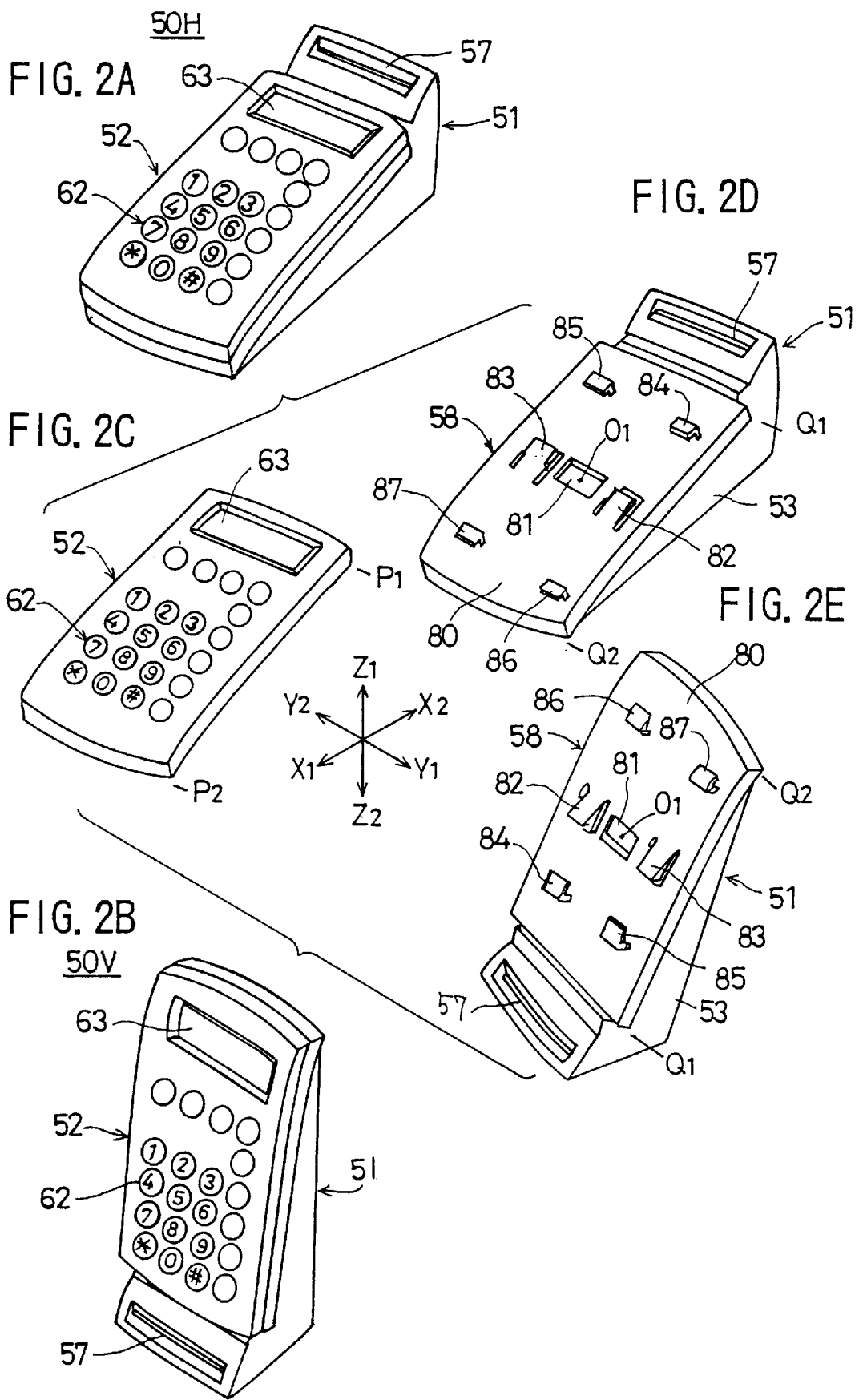

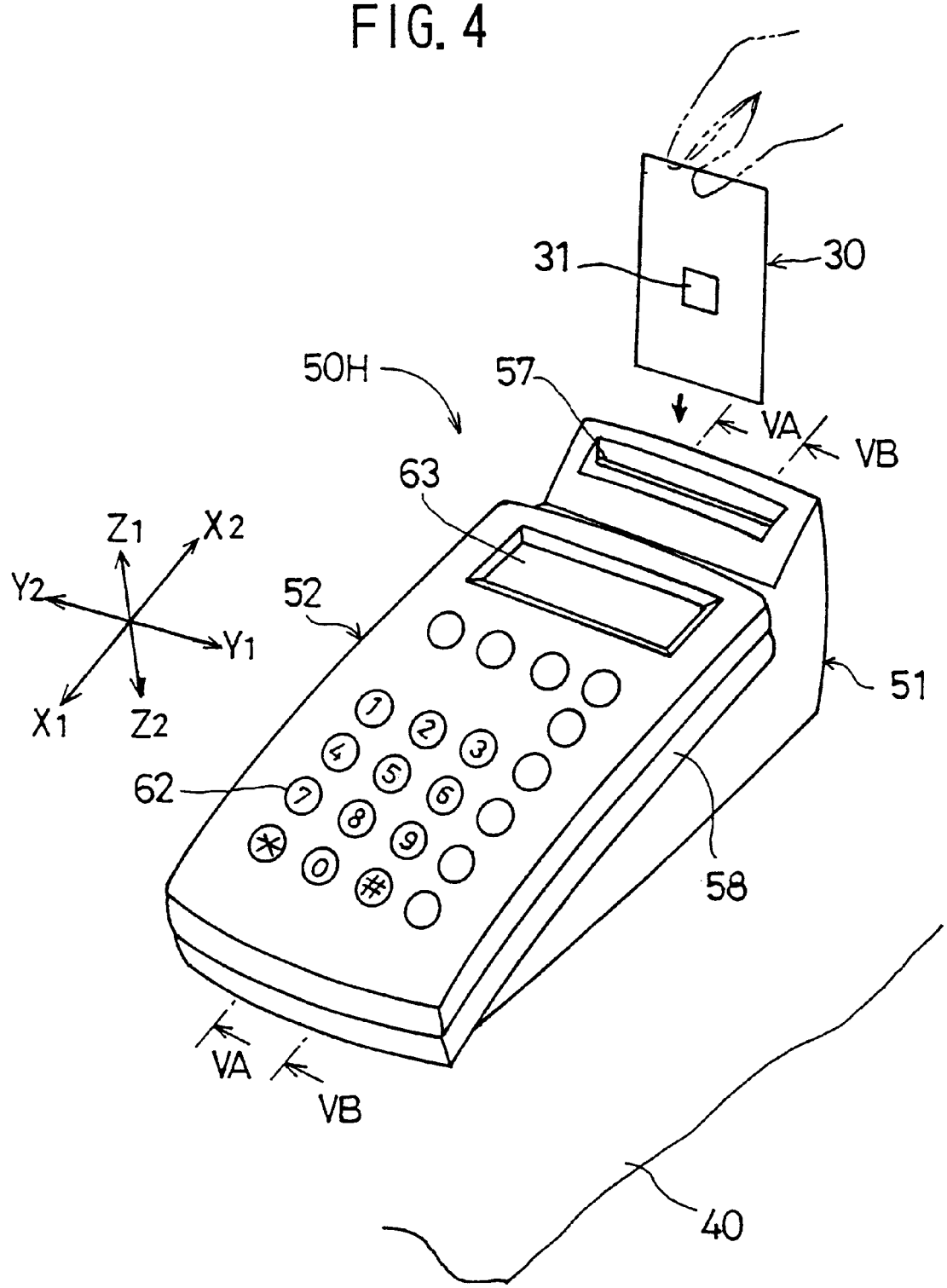

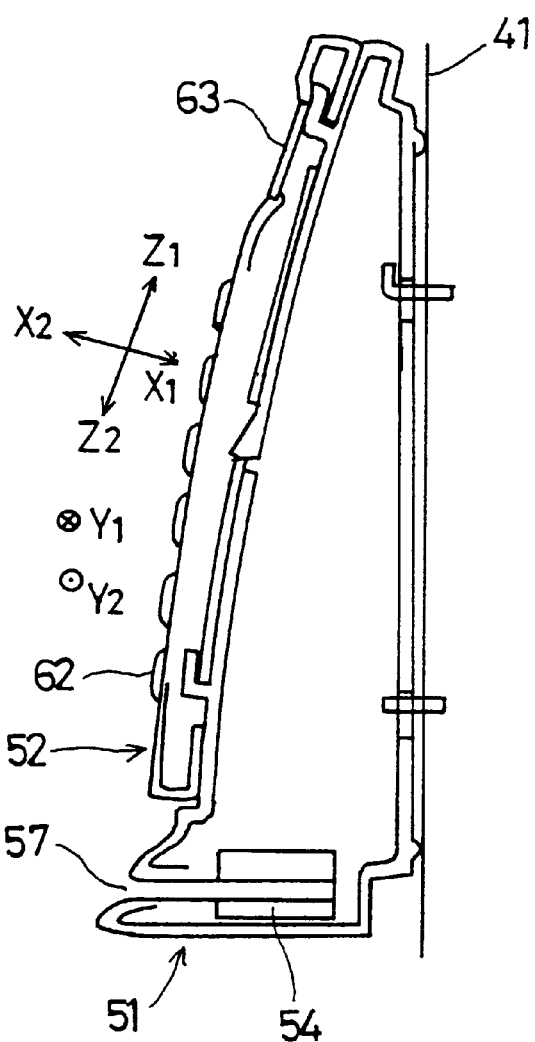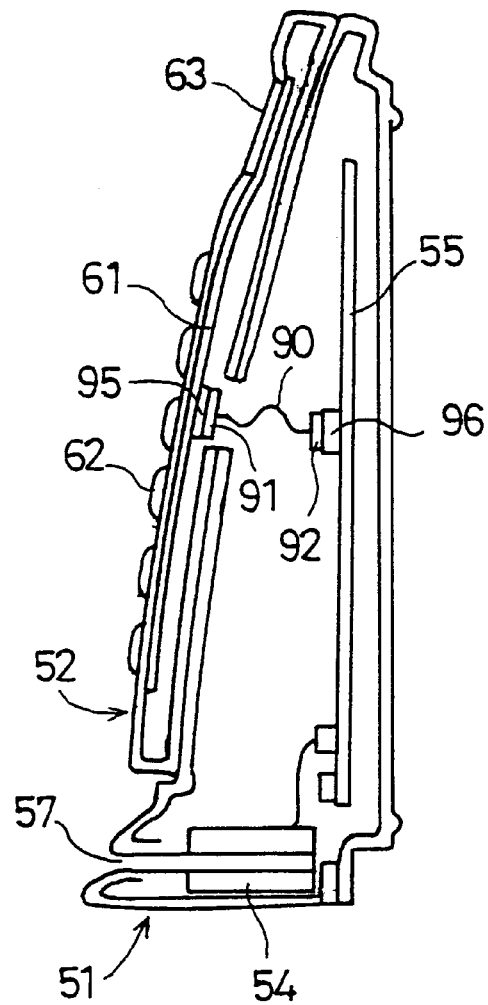

1

CARD TERMINAL APPARATUS INCLUDING CARD INSERTION ASSEMBLY AND USER INTERFACE ASSEMBLY WHEREIN THE USER INTERFACE ASSEMBLY IS LOADED ON THE CARD INSERTION ASSEMBLY IN A PLURALITY OF POSITIONS

BACKGROUND OF THE INVENTION

1. Field of the Invention

The present invention relates to a card terminal apparatus, and, in particular, to a card terminal apparatus, into which a card is inserted, and which is applied to an electronic money system in which giving and receiving of money is performed by giving and receiving electronic information.

Recently, an electronic money system is being developed. In the electronic money system, an IC chip is embedded in an IC card, and money in a form of electronic information is stored therein. A terminal apparatus for writing information in and reading information from the IC chip of the IC card is set in each house and each store. A system, in which computers, for managing the respective card terminal apparatuses and the information of the IC cards, are connected with each other via a network, is used.

Generally speaking, such card terminal apparatuses can be classified into two kinds with respect to their positions when they are used. The card terminal apparatus of one type is a horizontal placement type one, in which the operation surface thereof lies horizontally, and the card terminal apparatus of the other type is a vertical placement type one, in which the operation surface thereof stands vertically. The card terminal apparatus of the horizontal placement type is placed on a table or the like and used. The card terminal apparatus of the vertical placement type is hanged on a wall or the like and used.

2. Description of the Related Art

FIG. 1A shows a card terminal apparatus 10 of the horizontal placement type in the related art, and FIG. 1B shows a card terminal apparatus 20 of the vertical placement type in the related art.

The terminal apparatus 10 of the horizontal placement type is, in consideration of operational convenience, in a condition where it is placed on a table 40. An input key portion 12 and a liquid crystal display portion 13 are arranged on the operator side ($X_1$ side), and an IC card insertion hole 14 is arranged at a portion near to the head ($X_2$ side). An IC card 30 is inserted into the IC card insertion hole 14 from the top side in the position in which an operator can see an IC chip 31.

The terminal apparatus 20 of the vertical placement type is, in consideration of operational convenience, in a condition where it is hung on a wall 41. An IC card insertion hole 24 is arranged at a portion near to the bottom ($Z_2$ side), a liquid crystal display portion 23 is arranged at the head side ($Z_1$ side), and an input key portion 22 is arranged between the IC card insertion hole 24 and the liquid crystal display portion 23. The IC card 30 is inserted into the IC card insertion hole 24 from the front side in the position in which an operator can see the IC chip 31.

The card terminal apparatus 10 of the horizontal placement type is different from the card terminal apparatus 20 of the vertical placement type, and there are problems as described below.

When the card terminal apparatus 10 of the horizontal placement type is used in a vertical placement condition, it is difficult to operate the terminal apparatus 10 because, for example, the positions of the keys are reversed. Thus, it is impractical to use the card terminal apparatus 10 of the horizontal placement type in the vertical placement condition. Similarly, when the card terminal apparatus 20 of the vertical placement type is used in a horizontal placement condition, it is difficult to operate the terminal apparatus 10. Thus, it is impractical to use the card terminal apparatus 20 of the vertical placement type in the horizontal placement condition.

Therefore, when a manufacturer delivers card terminal apparatuses to a client, even when the number of the apparatuses to be delivered is realized, it is not possible to deliver the apparatuses when whether the apparatuses are of the horizontal placement type or of the vertical placement type is not realized. As a result, delivery and setting of the card terminal apparatuses may be delayed.

Further, when a client desires to change the type of the apparatuses between the horizontal placement type and the vertical placement type after ordering the apparatuses, the client must order additional apparatuses of the changed type. Thus, from an economical viewpoint, it is costly to change the setting type of the apparatuses.

SUMMARY OF THE INVENTION

An object of the present invention is to provide a card terminal apparatus which solve the above-mentioned problems by improving setting convenience.

A card terminal apparatus according to the present invention comprises:

a card insertion portion for a card to be inserted therein;

a card reading and writing unit for performing information reading from and writing in the card which has been inserted into the card insertion portion;

input key portions;

a display portion;

a first assembly having the card insertion portion and the card reading and writing unit at one end side thereof; and a second assembly having the input key portions and the display portion at one end side thereof, wherein:

the first assembly has a second-assembly loading portion adjacent to the card insertion portion; and the second assembly is loaded on the second-assembly loading portion in either one of two positions, a first position being a position in which the card insertion portion is adjacent to the display portion, a second position being a position in which the card insertion portion is adjacent to the input key portions.

Thus, by preparing the first assembly and the second assembly, it is possible to assemble either one of the card terminal apparatus of the horizontal placement type and the card terminal apparatus of the vertical placement type. Thus, at a site at which the card terminal apparatus is set, either one of the horizontal placement type one and the vertical placement type one can be assembled. Accordingly, in response to a client's order in which even the setting type (the horizontal placement type or the vertical placement type) of each apparatus has not specified but the number of the apparatuses to be shipped has been determined, the card terminal apparatuses can be shipped. Thereby, it is possible to perform speedy delivery and setting of the card terminal apparatuses in accordance with a client's requests. Further, change of the setting type of the card terminal apparatus in accordance with a client's request after once assembling the apparatus can be relatively easily performed. Further, only two metallic molds for resin molding are necessary for molding the first assembly and the second assembly. Accordingly, the costs for the metallic molds are inexpensive.

It may be that:
the second-assembly loading portion of the first assembly has a plurality of hooks arranged symmetrically about the center of the second-assembly loading portion; and
the second assembly has a plurality of engaging holes for being engaged with the hooks, respectively, the plurality of engaging holes being arranged symmetrically about the center of a rear surface of the second assembly.

Accordingly, even in a case where the position of the first assembly is reversed with respect to the second assembly, it is possible to normally load the second assembly on the second-assembly loading portion of the first assembly.

It may be that:
the second-assembly loading portion of the first assembly further has holding nails, which can elastically bend perpendicularly to the surface of the second assembly mounting portion, arranged symmetrically about the center of the second-assembly loading portion; and
the second assembly has holding holes for the holding nails to be inserted thereinto, respectively, the holding holes being arranged symmetrically about the center of a rear surface of the second assembly.

Accordingly, even in a case where the position of the first assembly is reversed with respect to the second assembly, it is possible to normally load the second assembly on the second-assembly loading portion of the first assembly. Further, it is possible to firmly connect the second assembly on the second-assembly loading portion of the first assembly.

It may be that:
the first assembly has a control printed substrate inside thereof, the control printed substrate including a control circuit;
the second assembly has an input key and liquid crystal display panel unit integrally formed inside thereof, the input key and liquid crystal display panel unit integrally having input keys and a liquid crystal display panel; and
the apparatus further comprises electrically connecting means for electrically connecting between the control printed substrate and the input key and liquid crystal display panel unit in a condition where the second assembly has been loaded on the first assembly.

It may be that:
the electrically connecting means comprises leaf-spring terminal members, one end of each being fixed on the control printed substrate, the other end of each projecting from the second-assembly loading portion, and terminal members which are provided on the input key and liquid crystal display panel unit; and
the other end of the leaf-spring terminal members comes into contact with the terminal members provided on the input key and liquid crystal display panel unit, respectively, in the condition where the second assembly is loaded on the second-assembly loading portion of the first assembly.

In this arrangement, merely by loading the second assembly on the first assembly, the leaf-spring terminal members of the first assembly come into contact with the terminal members of the second assembly. Thus, assembling work of the card terminal apparatus can be easily performed.

It may be that:
the first assembly has a control printed substrate inside thereof, the control printed substrate including a control circuit, the control printed substrate being provided with first signal transmitting and receiving means;
the second assembly has an input key and liquid crystal display panel unit integrally formed inside thereof, the input key and liquid crystal display panel unit integrally having input keys and a liquid crystal display panel, the input key and liquid crystal display panel unit being provided with second signal transmitting and receiving means; and
the first signal transmitting and receiving means and the second signal transmitting and receiving means face one another for transmitting and receiving a signal between the control printed substrate and the input key and liquid crystal display panel unit in a condition where the second assembly has been loaded on the first assembly.

In this arrangement, merely by loading the second assembly on the first assembly, signal transmission and reception between the first assembly and second assembly can be performed through the first signal transmitting and receiving means and the second signal transmitting and receiving means. Thus, assembling work of the card terminal apparatus can be easily performed.

It may be that the second assembly has an input key, liquid crystal display panel and control printed substrate unit inside thereof, the input key, liquid crystal panel and control printed substrate unit integrally having input keys, a liquid crystal display panel and a control printed substrate.

In this arrangement, because information transmission is performed without using space, a reliability of signal transmission can be improved. Further, in comparison to the arrangement in which the input key and liquid crystal display panel unit and the control printed substrate are separately provided, it is possible to reduce the manufacturing costs.

Other objects and further features of the present invention will become more apparent from the following detailed description when read in conjunction with the accompanying drawings.

BRIEF DESCRIPTION OF THE DRAWINGS

FIGS. 2A, 2B, 2C, 2D and 2E show assembling of card terminal apparatuses in a first embodiment of the present invention;

FIG. 4 shows the card terminal apparatus assembled to be of the horizontal placement type;

FIG. 7A shows a sectional view of the card terminal apparatus of the vertical placement type of FIG. 6 taken along the line VIIA—VIIA;

FIG. 7B shows a sectional view of the card terminal apparatus of the vertical placement type of FIG. 6 taken along the line VIIB—VIIB;

DETAILED DESCRIPTION OF THE PREFERRED EMBODIMENTS

FIGS. 2A, 2B, 2C, 2D and 2E show assembling of a card terminal apparatus 50H of a horizontal placement type and a card terminal apparatus 50V of a vertical placement type in a first embodiment of the present invention. Each of the card terminal apparatus 50H of the horizontal placement type and the card terminal apparatus 50V of the vertical placement type is a combination of a first assembly 51 and a second assembly 52. $X_1$ and $X_2$ are the longitudinal directions of the first assembly 51 and the second assembly 52, and $Y_1$ and $Y_2$ are the width directions thereof.

Figure 5A:
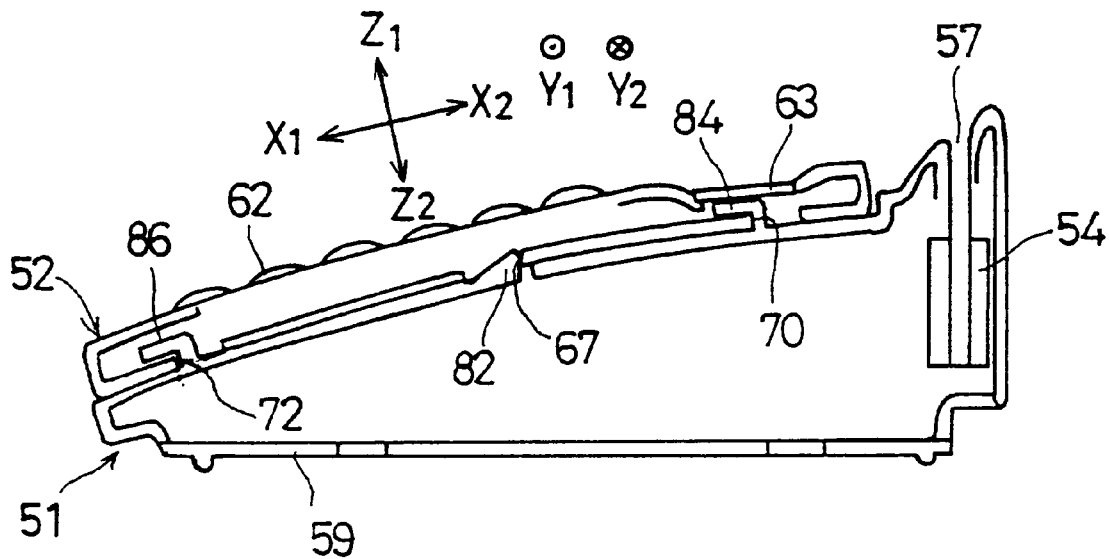
FIG. 5A shows a sectional view of the card terminal apparatus of the horizontal placement type of FIG. 4 taken along the line VA—VA.
Figure 5B:
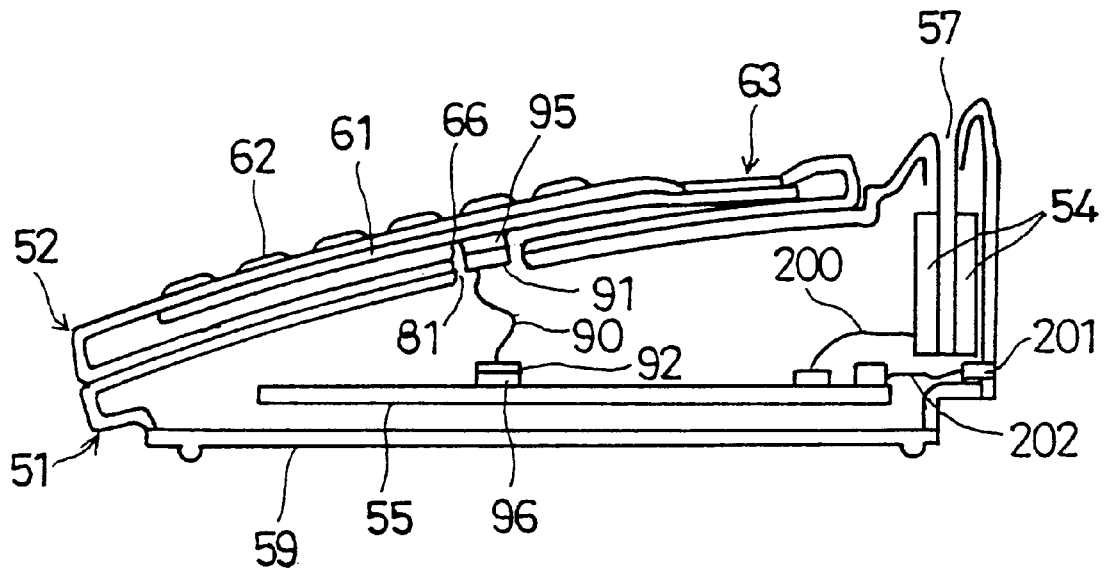
FIG. 5B shows a sectional view of the card terminal apparatus of the horizontal placement type of FIG. 4 taken along the line VB—VB.

The first assembly 51 includes, as also shown in FIGS. 5A and 5B, generally, a long and thin case 53 made of synthetic resin, an IC card reading and writing unit 54 and a control printed substrate 55 having a control circuit, which are contained in the case 53. As shown in FIG. 2D, the case 53 has an IC card insertion hole 57 and a second-assembly loading portion 58 on the top surface thereof. As shown in FIGS. 5A and 5B, the IC card reading and writing unit 54 is located at the depth of the IC card insertion hole 57. As shown in FIG. 5B, the IC card reading and writing unit 54 is connected with the control printed substrate 55 via a cable 200, and an external connector 201 for connecting the apparatus with a personal computer or the like is connected with the control printed substrate 55 via a cable 202. The bottom surface of the case 53 is covered by a bottom plate 59.

As shown in FIGS. 5A and 5B, the second assembly 52 has, generally, a board-like rectangular shape. In a flat case 60, an input key and liquid crystal display panel unit 61, which integrally has input keys and a liquid crystal display panel, is assembled. The second assembly 52 has, on the case 60, input key portions 62 and a liquid crystal display portion 63. As shown in FIG. 2C, the liquid crystal display portion 63 is located at a portion near to P1 and the input key portions 62 occupy a wide area from the position of P2 to the liquid crystal display portion 63.

Figure 1A:
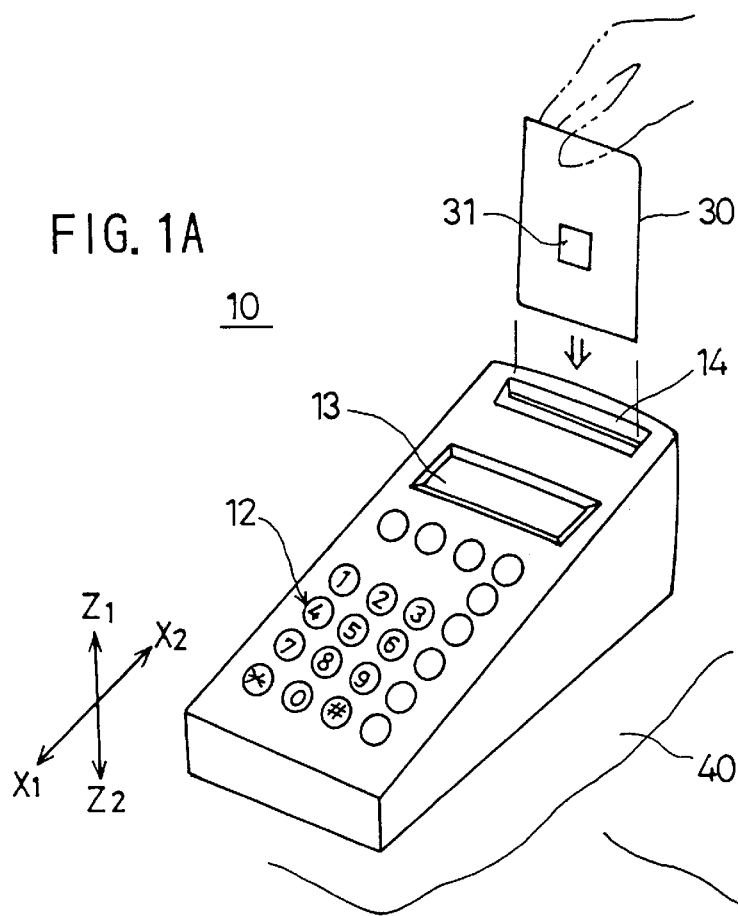
FIGS. 1A and 1B show card terminal apparatuses in the related art.
Figure 1B:
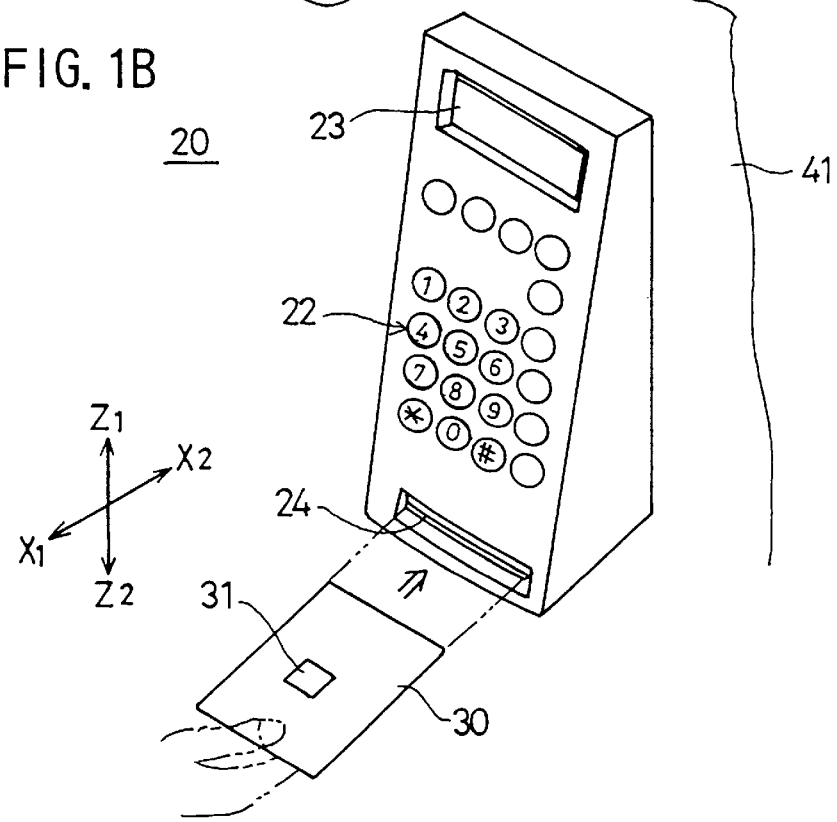
Figure 3:
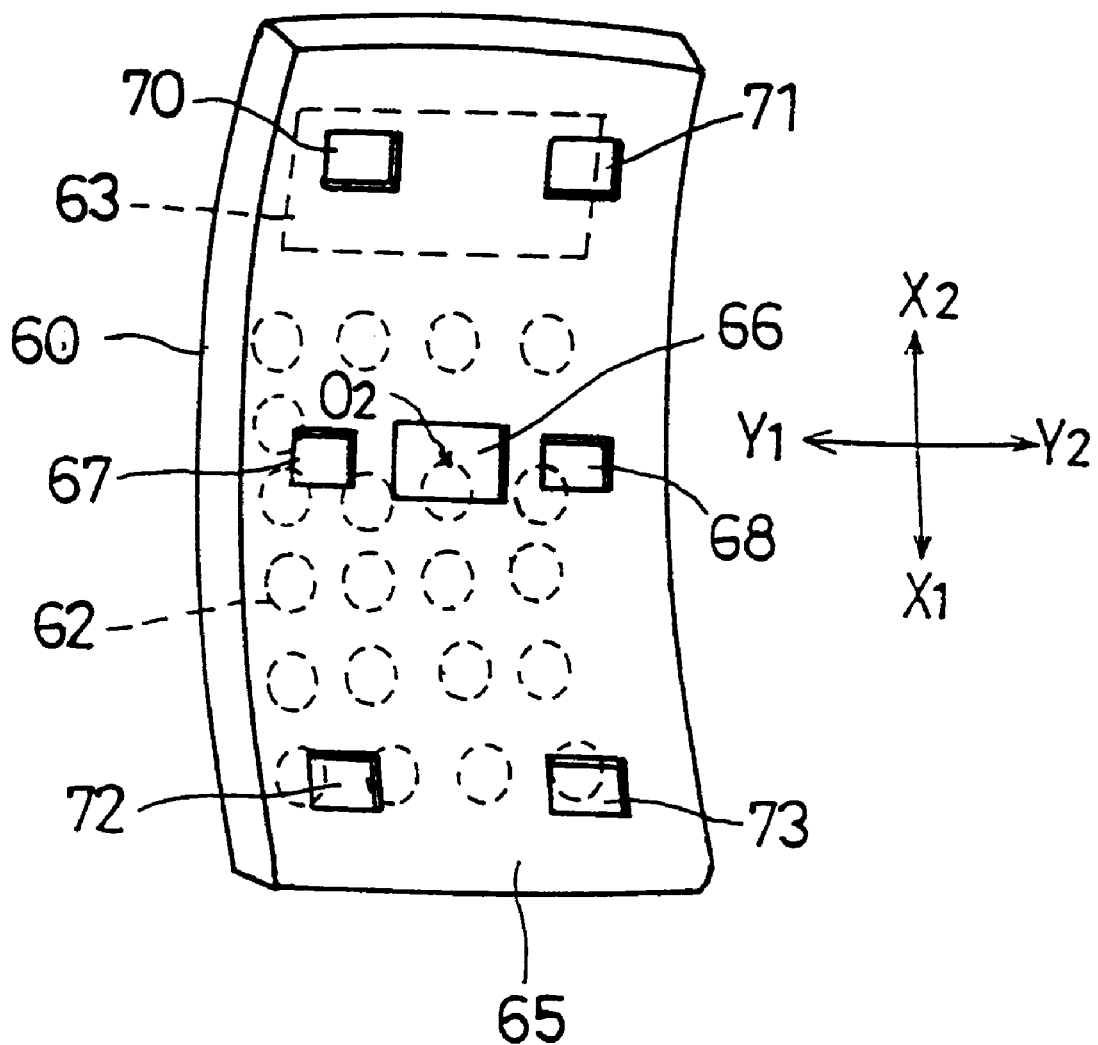
FIG. 3 shows a rear surface of a second assembly shown in FIG. 2C.

The second assembly 52 curves to correspond to a part of the cylindrical surface of a cylinder having a large radius of curvature. The curving is such that the surface of the second assembly 52, on which the input key portions 62 and the liquid crystal display portion 63 are provided, is convex. As shown in FIG. 3, on the inward-curved surface 65 of the curved second assembly 52, an opening 66 is formed at the center thereof. About the opening 66 (the center $O_2$), rectangular holding holes 67, 68, and rectangular engaging holes 70, 71, 72 and 73 are formed. The holding holes 67 and 68 are formed on the $Y_1$, $Y_2$ sides about the center $O_2$. The engaging holes 70, 71, 72 and 73 are formed in proximity to the respective corners of the second assembly 52. The holding holes 67 and 68 are arranged point-symmetrically about the center $O_2$. The engaging holes 70 and 73 are arranged point-symmetrically about the center $O_2$. The engaging holes 71 and 72 are arranged point-symmetrically about the center $O_2$.

As shown in FIG. 2D, the top surface of the case 53 of the first assembly 51 inclines downwardly along the $X_1$ direction from one end to the other end. The card insertion hole 57 is located on the top surface of the case 53 at the Q1 side at which the case 53 is relatively thick along the longitudinal direction of the case 53. The second-assembly loading portion 58 has a size corresponding to the size of the second assembly 52, has an approximately rectangular shape, and has a surface 80 (outward-curved surface corresponding to a part of the cylindrical surface of a cylinder having a large radius of curvature) corresponding to the inward-curved surface 65 of the curved second assembly 52. The second-assembly loading portion 58 has an opening 81 at the center $O_1$ thereof. About the opening 81 (center $O_1$), holding nails 82 and 83, and hooks 84, 85, 86 and 87 are formed. The holding nails 82 and 83 are arranged in the $Y_1$ and $Y_2$ directions about the center $O_1$ and have elasticity in the $Z_1$ and $Z_2$ directions (vertical direction with respect to the surface 80). The hooks 84, 85, 86 and 87 are L-shaped, respectively, and are located in proximity to the respective corners of the second-assembly loading portion 58. The L-shaped hooks 84, 85, 86 and 87 face the same direction (direction toward Q2), respectively. The holding nails 82 and 83 are arranged point-symmetrically about the center $O_1$. The hooks 84 and 87 are arranged point-symmetrically about the center $O_1$. The hooks 85 and 86 are arranged point-symmetrically about the center $O_1$.

Positional relationship is such that the holding holes 67 and 68 correspond to the holding nails 82 and 83, respectively, and the engaging holes 70, 71, 72, 73 correspond to the hooks 84, 85, 86 and 87, respectively.

Assembly of the card terminal apparatus 50H of the horizontal placement type and the card terminal apparatus 50V of the vertical placement type will now be described.

FIGS. 4, 5A and 5B show the card terminal apparatus 50H of the horizontal placement type. In the card terminal apparatus 50H in the horizontal placement type, as shown in FIG. 4, the first assembly 51 is in the position in which the IC card insertion hole 57 is located at the $X_2$-direction end. On the second-assembly loading portion 58 of the first assembly 51, the second assembly 52 is loaded in the position in which the liquid crystal display portion 63 is located at the $X_2$-direction end. As a result, as shown in FIG. 4, the crystal display portion 63 of the second assembly 52 is adjacent to the IC card insertion hole 57 of the first assembly 51.

The thus-assembled card terminal apparatus 50H in the horizontal placement type is, as shown in FIG. 4, in the condition where the apparatus 50H is placed on a table 40, the input key portions 62 are arranged at an operator side ($X_1$ side), the liquid crystal display portion 63 is arranged at the rear side of the input key portions 62, and the IC card insertion hole 57 is arranged at the further rear side. The IC card 30 is inserted into the IC card insertion hole 57 from the top side in the position in which an operator can see the IC chip 31.

Figure 6:
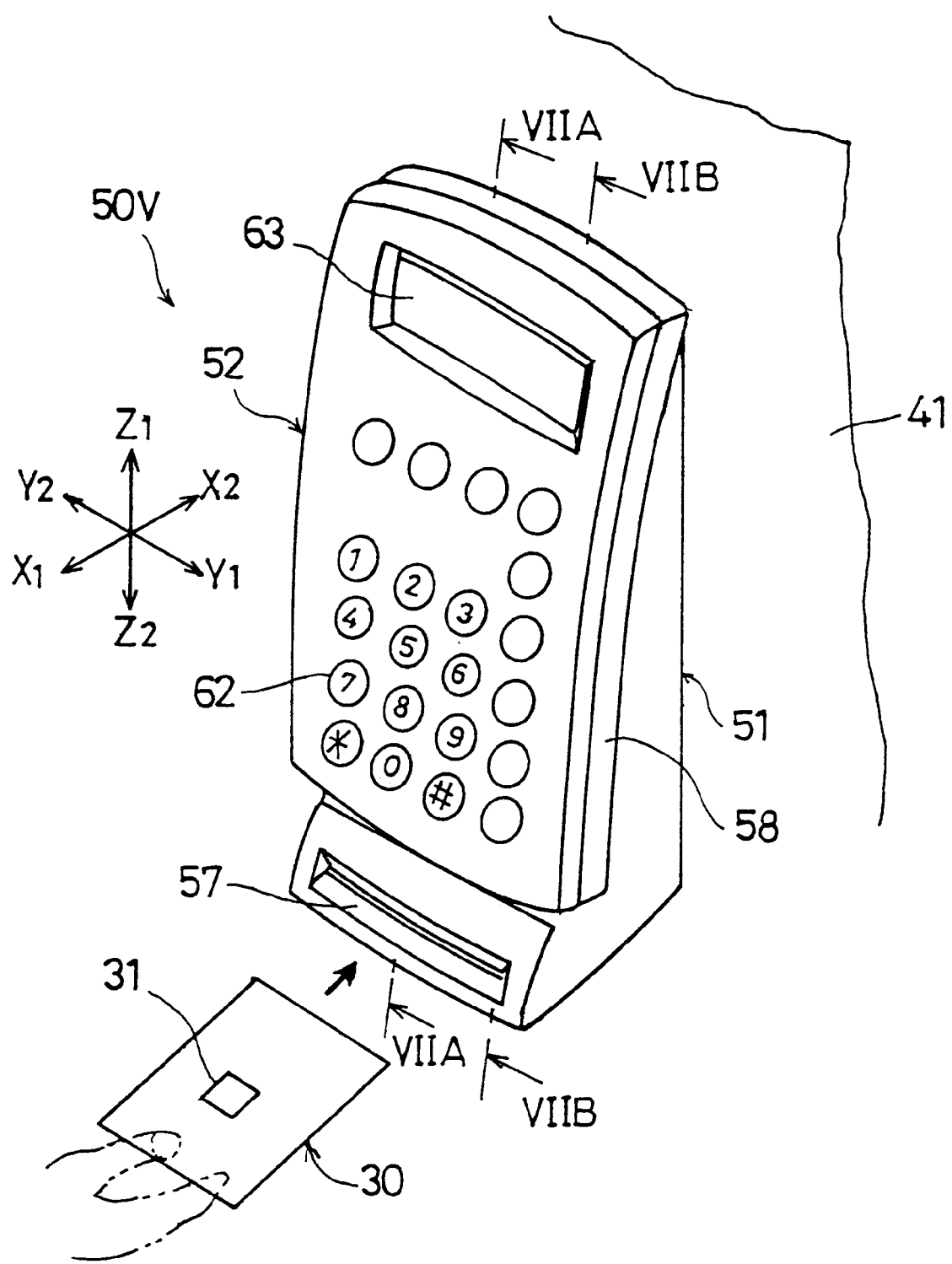
FIG. 6 shows the card terminal apparatus assembled to be of the vertical placement type.

FIGS. 6, 7A and 7B show the card terminal apparatus 50V in the vertical placement type. In the card terminal apparatus 50V in the vertical placement type, as shown in FIG. 6, the first assembly 51 is in the position in which the IC card insertion hole 57 is located at the $Z_2$-direction end. On the second-assembly loading portion 58 of the first assembly 51, the second assembly 52 is loaded in the position in which the liquid crystal display portion 63 is located at the $Z_1$-direction end. As a result, as shown in FIG. 7, the input key portions 62 of the second assembly 52 are adjacent to the IC card insertion hole 57 of the first assembly 51.

The thus-assembled card terminal apparatus 50V in the vertical placement type is, as shown in FIG. 7, in the condition where the apparatus 50V is placed on a wall 41, the input key portions 62 are arranged at a middle-height portion of the apparatus 50V, the liquid crystal display portion 63 is arranged at the top side of the input key portions 62, and the IC card insertion hole 57 is arranged at the bottom side of the input key portions 62. The IC card 30 is inserted into the IC card insertion hole 57 from the front side in the position in which an operator can see the IC chip 31.

Loading of the second assembly 52 on the first assembly 51 will now be described.

In the case of the card terminal apparatus 50H of the horizontal placement type, as shown in FIGS. 5A and 5B, the engaging holes 70, 71, 72 and 73 engage the hooks 84, 85, 86 and 87, respectively, and the holding holes 67 and 68 are held by the holding nails 82 and 83, respectively. Thus, movement of the second assembly 52 is prevented in the $X_1$, $X_2$, $Y_1$, $Y_2$, $Z_1$ and $Z_2$ directions with respect to the first assembly 51. Also, the inward-curved surface 65 of the second assembly 52 is in contact with the outward-curved surface 80 of the first assembly 51. In this condition, the second assembly 52 is loaded on the first assembly 51 without movement of the second assembly 52 on the first assembly 51.

In the case of the card terminal apparatus 50V of the vertical placement type, as shown in FIGS. 7A and 7B, the engaging holes 70, 71, 72 and 73 engage the hooks 87, 86, 85 and 84, respectively, and the holding holes 67 and 68 are held by the holding nails 83 and 82, respectively. Thus, movement of the second assembly 52 is prevented in the $Z_1$, $Z_2$, $Y_1$, $Y_2$, $X_1$ and $X_2$ direction with respect to the first assembly 51. Also, the inward-curved surface 65 of the second assembly 52 is in contact with the outward-curved surface 80 of the first assembly 51. In this condition, the second assembly 52 is loaded on the first assembly 51 without movement of the second assembly 52 on the first assembly 51.

Electric connection between the first assembly 51 and the second assembly 52 will now be described.

In the card terminal apparatus 50H of the horizontal placement type, as shown in FIG. 5B, and in the card terminal apparatus 50V of the vertical placement type, as shown in FIG. 7B, the input key and liquid crystal display panel unit 61 of the second assembly 52 is electrically connected with the control printed substrate 55 of the first assembly 51 by a cable 90. Connectors 91 and 92 are provided at the two ends of the cable 90, respectively. The connector 91 is connected to a connector 95 provided on the input key and liquid crystal display panel unit 61. The connector 92 is connected to a connector 96 provided on the control printed substrate 55. The cable 90 passes through the openings 66 and 81 which are aligned with one another.

The connector 91 is connected to the connector 95 and the connector 92 is connected to the connector 96 before the second assembly 52 is loaded on or connected with the first assembly 51. The cable 90 is sufficiently long that the above-mentioned connection work can be performed.

Work of mechanically connecting the second assembly 52 with the first assembly 51 will now be described.

In each of the case where the card terminal apparatus 50H of the horizontal placement type is assembled and the case where the card terminal apparatus 50V of the vertical placement type is assembled, mechanically connecting the secondary assembly 52 with the first assembly 51 can be achieved merely by work of pushing the second assembly 52 onto the first assembly 51 and work of laterally shifting the second assembly 52 with respect to the first assembly 51.

Figure 8A:
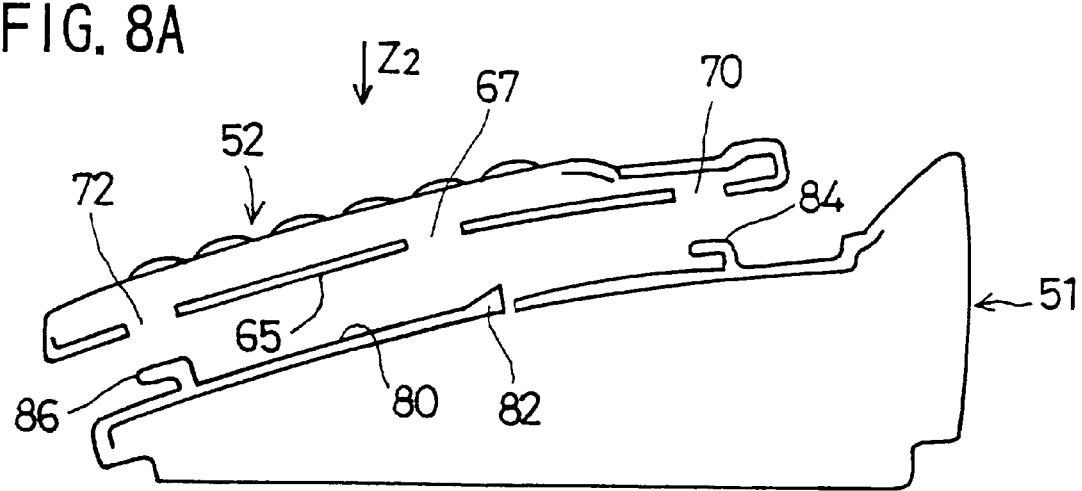
FIGS. 8A, 8B and 8C show a procedure of loading the second assembly on a first assembly for assembling the card terminal apparatus of the horizontal placement type.
Figure 8B:
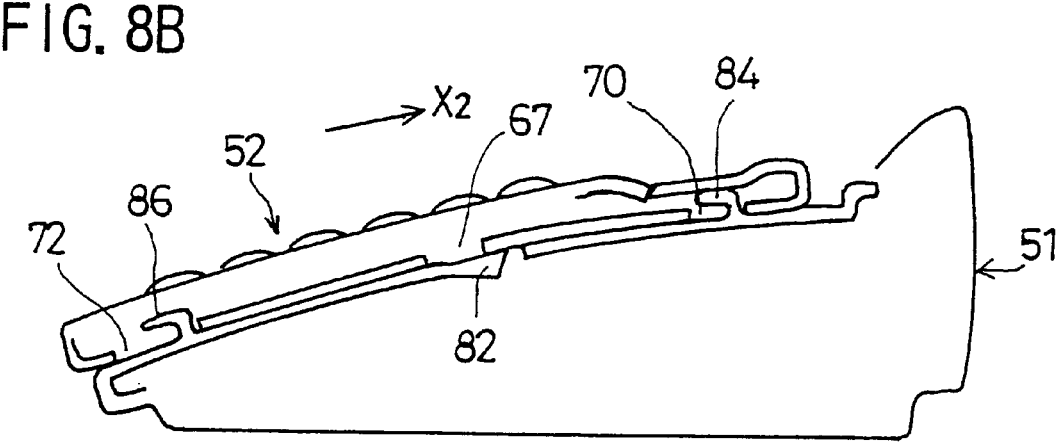
Figure 8C:
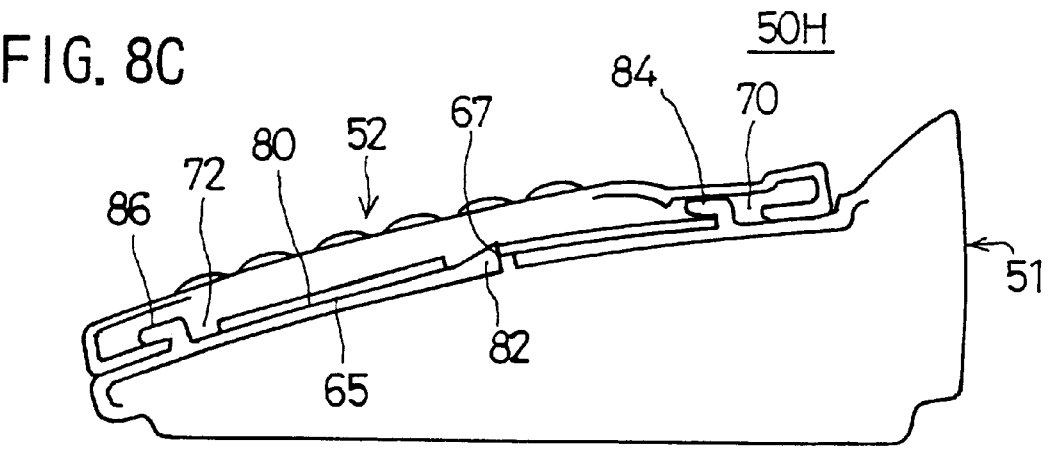

In the case where the card terminal apparatus 50H of the horizontal placement type is assembled, first, as shown in FIG. 8A, the engaging holes 70 (71) and 72 (73) are caused to be aligned with the hooks 84 (85) and 86 (87). In this condition, the second assembly 52 is pushed onto the first assembly 51 in the $Z_2$ direction. Thereby, as shown in FIG. 8B, the hooks 84, 86 (85, 87) are inserted into the second assembly 52 via the engaging holes 70, 72 (71, 73). Further, the inward-curved surface 65 pushes the holding nails 82 (83) so as to cause the holding nails 82 (83) to elastically bend in the $Z_2$ direction. Then, the second assembly is caused to slide in the $X_2$ direction until the sliding cannot be continued. Thereby, as shown in FIG. 8C, the edges of the engaging holes 70, 72 (71, 73) are engaged with the hooks 84, 86 (85, 87), respectively. Further, as a result of the holding holes 67 (68) being aligned with the holding nails 82 (83), the holding nails 82 (83) elastically return to the original position. Thus, the holding nails 82 (83) are inserted into the holding holes 67 (68), respectively.

Figure 9A:
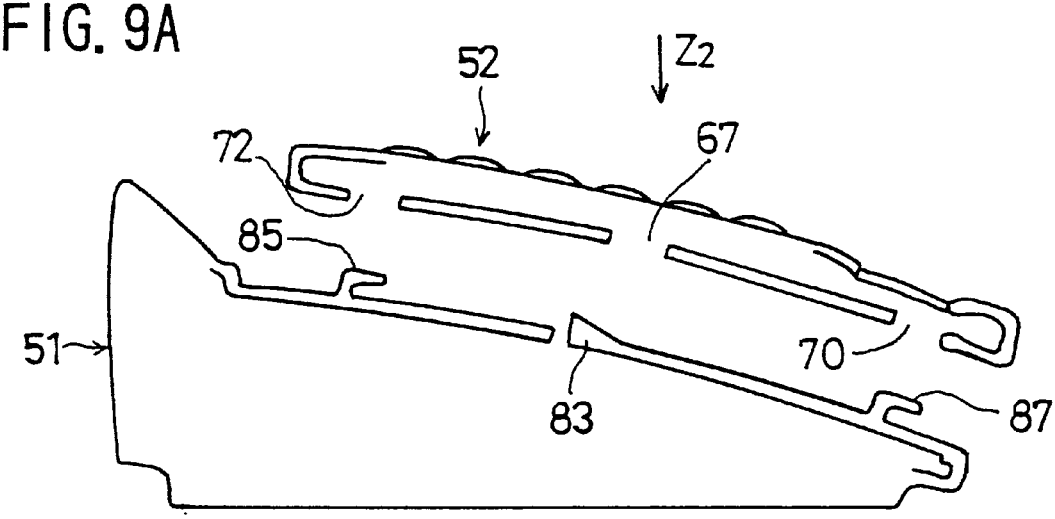
FIGS. 9A, 9B and 9C show a procedure of loading the second assembly on the first assembly for assembling the card terminal apparatus of the vertical placement type.
Figure 9B:
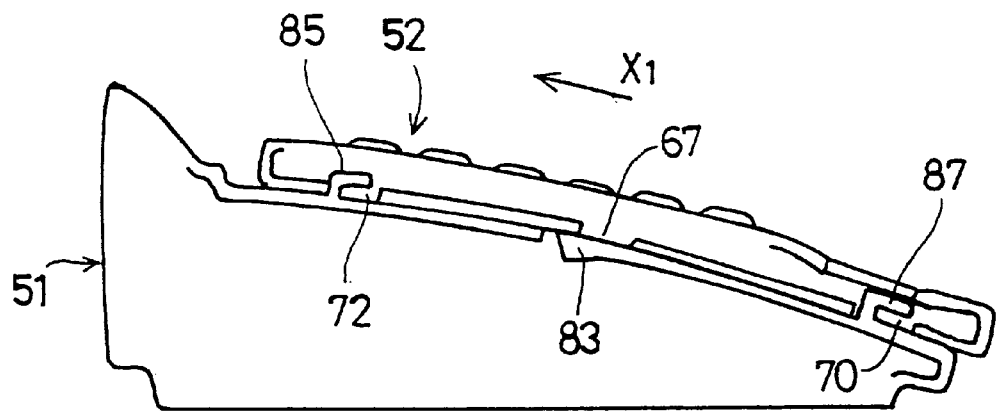
Figure 9C:
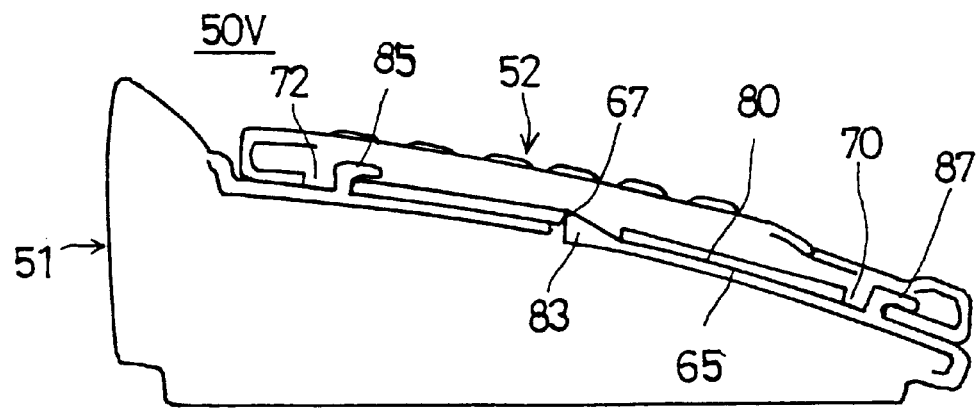

In the case where the card terminal apparatus 50V of the vertical placement type is assembled, first, as shown in FIG. 9A, the engaging holds 70 (71) and 72 (73) are caused to be aligned with the hooks 87 (86) and 85 (84). In this condition, the second assembly 52 is pushed onto the first assembly 51 in the $Z_2$ direction. Thereby, as shown in FIG. 9B, the hooks 87, 85 (86, 84) are inserted into the second assembly 52 via the engaging holes 70, 72 (71, 73). Further, the inward-curved surface 65 pushes the holding nails 82 (83) so as to cause the holding nails 83 (82) to elastically bend in the $Z_2$ direction. Then, the second assembly is caused to slide in the $X_1$ direction until the sliding cannot be continued. Thereby, as shown in FIG. 9C, the edges of the engaging holes 70, 72 (71, 73) are engaged with the hooks 87, 85 (86, 84), respectively. Further, as a result of the holding holes 67 (68) being aligned with the holding nails 83 (82), the holding nails 83 (82) elastically return to the original position. Thus, the holding nails 83 (82) are inserted into the holding holes 67 (68), respectively.

Thus, the work of mechanically connecting the second assembly 52 to the first assembly 51 and thus loading the second assembly 52 on the first assembly is easy.

Thus, at a site at which the card terminal apparatus is set, either one of the horizontal placement type one and the vertical placement type one can be assembled. Thus, setting convenience of the card terminal apparatus is improved in comparison to the related art. Accordingly, in response to a client's order in which even the setting type (the horizontal placement type or the vertical placement type) of each apparatus has not been specified but the number of the apparatuses to be shipped has been determined, the card terminal apparatuses can be shipped. Thereby, it is possible to perform speedy setting of the card terminal apparatuses in accordance with client's requests.

Change of the setting type of the card terminal apparatus in accordance with a client's request after once assembling the apparatus can be relatively easily performed. In each case where the setting type of the card terminal apparatus is changed from the horizontal placement type to the vertical placement type and the case where the setting type of the card terminal apparatus is changed from the vertical placement type to the horizontal placement type, it is necessary to remove the holding nails 82, 83 from the holding holes 67, 68, respectively. This work can be relatively easily performed by removing the bottom plate 59 from the first assembly 51 and removing the holding nails 82, 83 from the holding holes 67, 68, respectively, using a tool such as, for example, a screwdriver.

Further, only two metallic molds for resin molding are necessary for molding the case 53 and the case 60. Accordingly, the costs for the metallic molds are inexpensive.

Other embodiments of the present invention will now be described.

Figure 10:
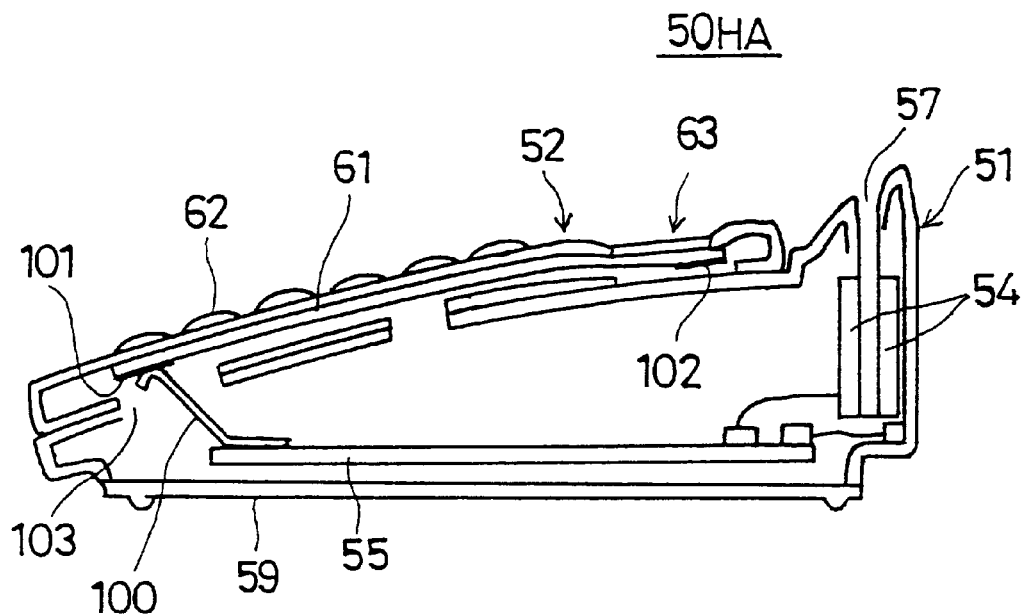
FIG. 10 shows a side sectional elevation view of a card terminal apparatus of the horizontal placement type in a second embodiment of the present invention.

FIG. 10 shows a card terminal apparatus 50HA of the horizontal placement type in a second embodiment of the present invention. The card terminal apparatus 50HA in the second embodiment is similar to the above-described card terminal apparatus 50H in the first embodiment. In the second embodiment, the reference numerals, the same as those of the first embodiment, are given for the substantially identical parts/components. Only different features will now be described. In the second embodiment, ends of leaf-spring terminal members 100 are fixed on the control printed substrate 55 in the first assembly 51. Terminal members 101, 102 are provided at each of the two ends of the input key and liquid crystal display panel unit 61 in the second assembly 52. The other ends of the leaf-spring terminal members 100 project from the second-assembly loading portion 58. In the condition where the second assembly 52 has been loaded on the first assembly 51, the other ends of the leaf-spring terminal members 100 are in contact with the terminal members 101 of the second assembly 52, respectively. Thus, the second assembly 52 and the first assembly 51 are electrically connected with one another.

Because the leaf-spring terminal members 100 and the terminal members 101 are used, it is not necessary to connect connectors before the second assembly 52 is loaded on the first assembly 51 as in the first embodiment. Merely by loading the second assembly 52 on the first assembly 51, the leaf-spring terminal members 100 are inserted into the second assembly through an opening 103 formed on the second assembly 52 and come into contact with the terminal members 101, respectively. Accordingly, the assembling work of the card terminal apparatus 50HA is easily performed in comparison to the case of the first embodiment.

In the case where a card terminal apparatus of the vertical placement type is assembled in the second embodiment, the leaf-spring terminal members 100 come into contact with the terminal members 102, respectively.

Figure 11:
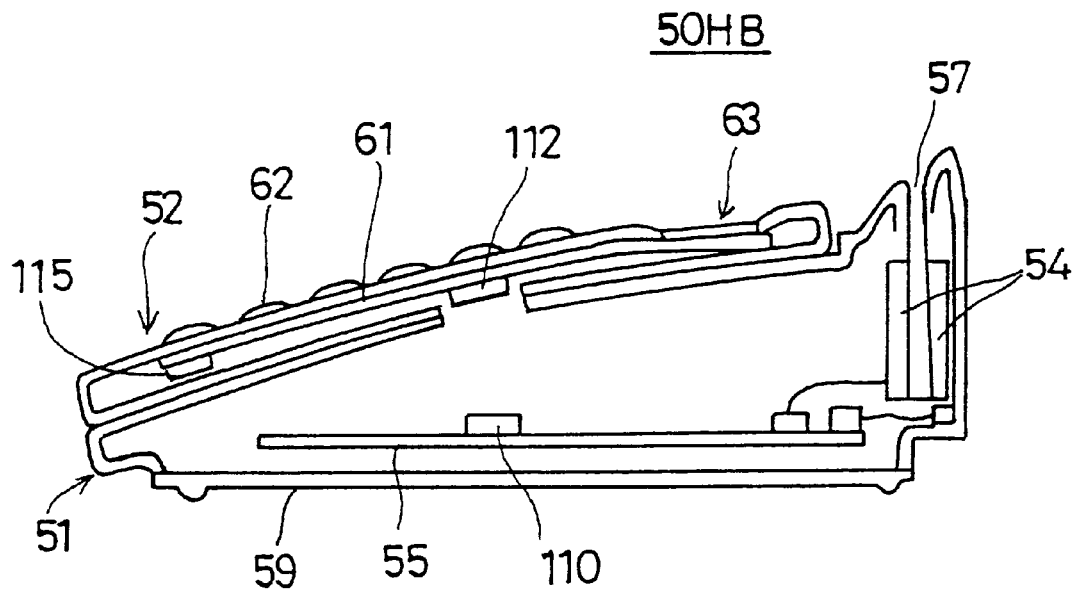
FIG. 11 shows a side sectional elevation view of a card terminal apparatus of the horizontal placement type in a third embodiment of the present invention.

FIG. 11 shows a card terminal apparatus 50HB of the horizontal placement type in a third embodiment of the present invention. The card terminal apparatus 50HB in the third embodiment is similar to the above-described card terminal apparatus 50H in the first embodiment. In the third embodiment, the reference numerals, the same as those of the first embodiment, are given for the substantially identical parts/components. Only different features will now be described. In the third embodiment, an infrared-ray emitting and receiving unit 110 is fixed on the control printed substrate 55 in the first assembly 51. Also, an infrared-ray emitting and receiving unit 112 is fixed on the input key and liquid crystal display panel unit 61 in the second assembly 52. A battery 115 for supplying power to the input key and liquid crystal display panel unit 61 and to the infrared-ray emitting and receiving unit 112 is mounted on the input key and liquid crystal display panel unit 61. In the condition where the second assembly 52 has been loaded on the first assembly 51, the infrared-ray emitting and receiving unit 112 faces the infrared-ray emitting and receiving unit 110. Thereby, the second assembly 52 and the first assembly 51 are optically connected with one another. Information transmission and reception between the first assembly 51 and the second assembly 52 are performed optically through infrared rays.

Also in the case where a card terminal apparatus of the vertical placement type is assembled in the third embodiment, in the condition where the second assembly 52 has been loaded on the first assembly 51, the infrared-ray emitting and receiving unit 112 faces the infrared-ray emitting and receiving unit 110. Thereby, the second assembly 52 and the first assembly 51 are optically connected with one another. Information transmission and reception between the first assembly 51 and the second assembly 52 are performed optically through infrared rays.

Figure 12:
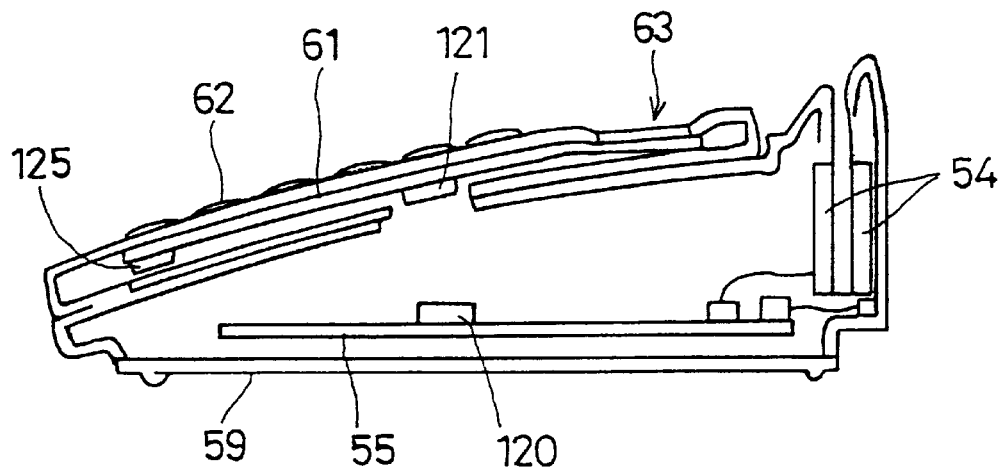
FIG. 12 shows a side sectional elevation view of a card terminal apparatus in the horizontal placement type in a fourth embodiment of the present invention.

FIG. 12 shows a card terminal apparatus 50HC of the horizontal placement type in a fourth embodiment of the present invention. The card terminal apparatus 50HC in the fourth embodiment is similar to the above-described card terminal apparatus 50H in the first embodiment. In the fourth embodiment, the reference numerals, the same as those of the first embodiment, are given for the substantially identical parts/components. Only different features will now be described. In the fourth embodiment, a radio transmitting and receiving unit 120 is fixed on the control printed substrate 55 in the first assembly 51. Also, a radio transmitting and receiving unit 121 is fixed on the input key and liquid crystal display panel unit 61 in the second assembly 52. A battery 125 for supplying power to the input key and liquid crystal display panel unit 61 and to the radio transmitting and receiving unit 121 is mounted on the input key and liquid crystal display panel unit 61. In the condition where the second assembly 52 has been loaded on the first assembly 51, the radio transmitting and receiving unit 121 faces the radio transmitting and receiving unit 120. Information transmission and reception between the first assembly 51 and the second assembly 52 are performed through radio communication.

Also in the case where a card terminal apparatus of the vertical placement type is assembled in the fourth embodiment, in the condition where the second assembly 52 has been loaded on the first assembly 51, the radio transmitting and receiving unit 121 faces the radio transmitting and receiving unit 120. Information transmission and reception between the first assembly 51 and the second assembly 52 are performed through radio communication.

In each embodiment described above, it is also possible that the second assembly 52 has only input key portions. In such a case, instead of the input key and liquid crystal display panel unit 61, an input key unit which integrally has input keys is provided. Similarly, in each embodiment described above, it is also possible that the second assembly 52 has only a liquid crystal display portion. In such a case, instead of the input key and liquid crystal display panel unit 61, a liquid crystal display panel unit which integrally has a liquid crystal display panel is provided.

Figure 13:
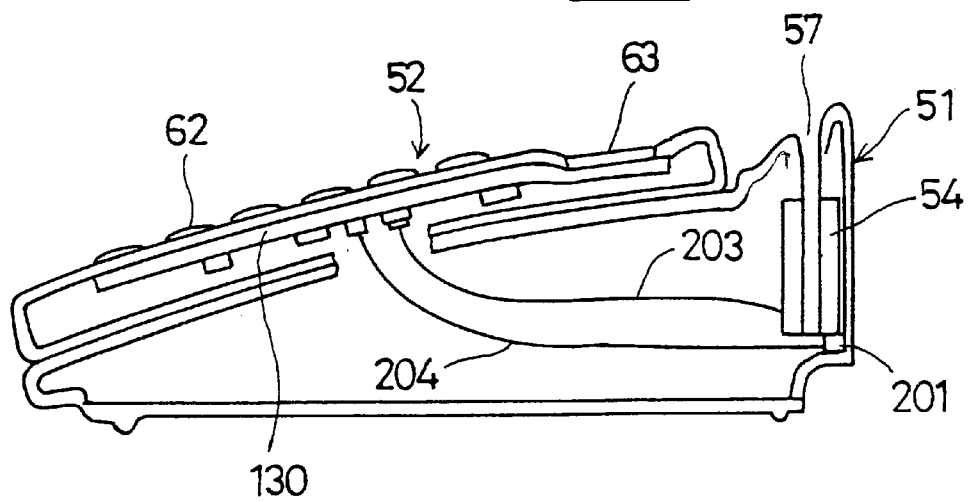
FIG. 13 shows a side sectional elevation view of a card terminal apparatus in the horizontal placement type in a fifth embodiment of the present invention.

FIG. 13 shows a card terminal apparatus 50HD of the horizontal placement type in a fifth embodiment of the present invention. The card terminal apparatus 50HC in the fifth embodiment is similar to the above-described card terminal apparatus 50H in the first embodiment. In the fifth embodiment, the reference numerals, the same as those of the first embodiment, are given for the substantially identical parts/components. Only different features will now be described. In the fifth embodiment, an input key, liquid crystal display panel and control printed substrate unit 130 is assembled in the second assembly 52. The input key, liquid crystal display panel and control printed substrate unit 130 is obtained as a result of integrating the above-described input key and liquid crystal display panel unit 61 with the control printed substrate 55. In the fifth embodiment, before the second assembly 52 is loaded on the first assembly 51, the input key, liquid crystal display panel and control printed substrate unit 130 is connected with the IC card reading and writing unit 54 by a cable 203 and the input key, liquid crystal display panel and control printed substrate unit 130 is connected with the external connector 201 by a cable 204. Similar to the case of the first embodiment, the cables 203 and 204 are sufficiently long that the above-mentioned connection work can be performed.

Also in the case where a card terminal apparatus of the vertical placement type is assembled in the fifth embodiment, before the second assembly 52 is loaded on the first assembly 51, the input key, liquid crystal display panel and control printed substrate unit 130 is connected with the IC card reading and writing unit 54 by a cable 203 and the input key, liquid crystal display panel and control printed substrate unit 130 is connected with the external connector 201 by a cable 204.

In the card terminal apparatus in the fifth embodiment, because information transmission is performed without using space, reliability of signal transmission can be improved in comparison to the third and fourth embodiments. Further, in comparison to the embodiments in which the input key and liquid crystal display panel unit 61 and the control printed substrate 55 are separately provided, it is possible to reduce the manufacturing costs.

As mentioned above, it is also possible that the second assembly 52 has only the input key portions. In such a case, in the fifth embodiment, instead of the input key, liquid crystal display panel and control printed substrate unit 130, an input key and control printed substrate unit, which is obtained as a result of integrating the above-mentioned input key unit with the control printed substrate 55, is provided. Similarly, as mentioned above, it is also possible that the second assembly 52 has only the liquid crystal display portion. In such a case, in the fifth embodiment, instead of the input key, liquid crystal display panel and control printed substrate unit 130, a liquid crystal display panel and control printed substrate unit, which is obtained as a result of integrating the above-mentioned liquid crystal display panel unit with the control printed substrate 55, is provided.

A card terminal apparatus according to the present invention is not necessarily limited to one for the IC card. The present invention can also be applied to a card terminal apparatus for a magnetic card.

Further, the present invention is not limited to the above-described embodiments, and variations and modifications may be made without departing from the scope of the present invention.

What is claimed is:

1. A card terminal apparatus comprising:

a card insertion assembly having a card insertion portion for a card to be inserted therein, and a card reading and writing unit for performing information reading from and writing in the card inserted into said card insertion portion; and a user interface assembly having an input key portion, wherein:

said card insertion assembly having a user-interface-assembly loading portion adjacent to said card insertion portion; and said user interface assembly is loaded on said user-interface-assembly loading portion in either one of two positions, a first position being a position in which said card insertion portion is located near the top of said input key portion, a second position being a position in which said card insertion portion is located near the bottom of said input key portion.

2. The card terminal apparatus according to claim 1, wherein:

said user-interface-assembly loading portion of said card insertion assembly has a plurality of hooks arranged symmetrically about the center of said user-interface-assembly loading portion; and said user interface assembly has a plurality of engaging holes for being engaged with the hooks, respectively, said plurality of engaging holes being arranged symmetrically about the center of a rear surface of said user interface assembly.

3. The card terminal apparatus according to claim 1, wherein:

said user-interface-assembly loading portion of said card insertion assembly further has holding nails, which can elastically bend perpendicularly to the surface of said user interface assembly loading portion, arranged symmetrically about the center of said user-interface-assembly loading portion; and said user interface assembly has holding holes for said holding nails to be inserted thereinto, respectively, said holding holes being arranged symmetrically about the center of a rear surface of said user interface assembly.

4. The card terminal apparatus according to claim 1, wherein:

said card insertion assembly has a control printed substrate inside thereof, said control printed substrate including a control circuit;

said user interface assembly has a user interface unit formed integrally inside thereof, said user interface unit integrally having input keys; and said apparatus further comprises electrically connecting means for electrically connecting between said control printed substrate and said user interface unit in a condition where said user interface assembly has been loaded on said card insertion assembly.

5. The card terminal apparatus according to claim 4, wherein:

said electrically connecting means comprises leaf-spring terminal members, one end of each being fixed on said control printed substrate, the other end of each projecting from said user-interface-assembly loading portion, and terminal members which are provided on said user interface unit; and said other end of said leaf-spring terminal members comes into contact with said terminal members provided on said user interface unit, respectively, in the condition where said user interface assembly is loaded on said user-interface-assembly loading portion of said card insertion assembly.

6. The card terminal apparatus according to claim 1, wherein:
   said card insertion assembly has a control printed substrate inside thereof, said control printed substrate including a control circuit, said control printed substrate being provided with first signal transmitting and receiving means;
   said user interface assembly has a user interface unit integrally formed inside thereof, said user interface unit integrally having input keys, said user interface unit being provided with second signal transmitting and receiving means; and
   said first signal transmitting and receiving means and said second signal transmitting and receiving means face one another for transmitting and receiving a signal between said control printed substrate and said user interface unit in a condition where said user interface assembly has been loaded on said card insertion assembly.

7. The card terminal apparatus according to claim 1, wherein said user interface assembly has a user interface unit inside thereof, said user interface unit integrally having input keys and a control printed substrate.

8. A card terminal apparatus comprising:
   a card insertion assembly having a card insertion portion for a card to be inserted therein, and a card reading and writing unit for performing information reading from and writing in the card inserted into said card insertion portion; and
   a user interface assembly having a display portion, wherein:
   said card insertion assembly having a user-interface-assembly loading portion adjacent to said card insertion portion; and
   said user interface assembly is loaded on said user-interface-assembly loading portion in either one of two positions, a first position being a position in which said card insertion portion is located near the top of said display portion, a second position being a position in which said card insertion portion is located near the bottom of said display portion.

9. The card terminal apparatus according to claim 8, wherein:
   said user-interface-assembly loading portion of said card insertion assembly has a plurality of hooks arranged symmetrically about the center of said user-interface-assembly loading portion; and
   said user interface assembly has a plurality of engaging holes for being engaged with the hooks, respectively, said plurality of engaging holes being arranged symmetrically about the center of a rear surface of said user interface assembly.

10. The card terminal apparatus according to claim 8, wherein:
   said user-interface-assembly loading portion of said card insertion assembly further has holding nails, which can elastically bend perpendicularly to the surface of said user interface assembly loading portion, arranged symmetrically about the center of said user-interface-assembly loading portion; and
   said user interface assembly has holding holes for said holding nails to be inserted thereinto, respectively, said holding holes being arranged symmetrically about the center of a rear surface of said user interface assembly.

11. The card terminal apparatus according to claim 8, wherein:
   said card insertion assembly has a control printed substrate inside thereof, said control printed substrate including a control circuit;
   said user interface assembly has a user interface unit formed integrally inside thereof, said user interface unit integrally having a liquid crystal display panel; and
   said apparatus further comprises electrically connecting means for electrically connecting between said control printed substrate and said user interface unit in a condition where said user interface assembly has been loaded on said card insertion assembly.

12. The card terminal apparatus according to claim 11, wherein:
   said electrically connecting means comprises leaf-spring terminal members, one end of each being fixed on said control printed substrate, the other end of each projecting from said user-interface-assembly loading portion, and terminal members which are provided on said user interface unit; and
   said other end of said leaf-spring terminal members comes into contact with said terminal members provided on said user interface unit, respectively, in the condition where said user interface assembly is loaded on said user-interface-assembly loading portion of said card insertion assembly.

13. The card terminal apparatus according to claim 8, wherein:
   said card insertion assembly has a control printed substrate inside thereof, said control printed substrate including a control circuit, said control printed substrate being provided with first signal transmitting and receiving means;
   said user interface assembly has a user interface unit integrally formed inside thereof, said user interface unit integrally having a liquid crystal display panel, said user interface unit being provided with second signal transmitting and receiving means; and
   said first signal transmitting and receiving means and said second signal transmitting and receiving means face one another for transmitting and receiving a signal between said control printed substrate and said user interface unit in a condition where said user interface assembly has been loaded on said card insertion assembly.

14. The card terminal apparatus according to claim 8, wherein said user interface assembly has a user interface unit inside thereof, said user interface unit integrally having a liquid crystal display panel and a control printed substrate.

15. A card terminal apparatus comprising:
   a card insertion assembly having a card insertion portion for a card to be inserted therein, and a card reading and writing unit for performing information reading from and writing in the card inserted into said card insertion portion; and
   a user interface assembly having an input key portion and a display portion, wherein:
   said card insertion assembly having a user-interface-assembly loading portion adjacent to said card insertion portion; and
   said user interface assembly is loaded on said user-interface-assembly loading portion in either one of two positions, a first position being a position in which said card insertion portion is adjacent to said display portion, a second position being a position in which said card insertion portion is adjacent to said input key portion.

16. The card terminal apparatus according to claim 15, wherein:
  said user-interface-assembly loading portion of said card insertion assembly has a plurality of hooks arranged symmetrically about the center of said user-interface-assembly loading portion; and
  said user interface assembly has a plurality of engaging holes for being engaged with the hooks, respectively, said plurality of engaging holes being arranged symmetrically about the center of a rear surface of said user interface assembly.

17. The card terminal apparatus according to claim 15, wherein:
  said user-interface-assembly loading portion of said card insertion assembly further has holding nails, which can elastically bend perpendicularly to the surface of said user interface assembly loading portion, arranged symmetrically about the center of said user-interface-assembly loading portion; and
  said user interface assembly has holding holes for said holding nails to be inserted thereinto, respectively, said holding holes being arranged symmetrically about the center of a rear surface of said user interface assembly.

18. The card terminal apparatus according to claim 15, wherein:
  said card insertion assembly has a control printed substrate inside thereof, said control printed substrate including a control circuit;
  said user interface assembly has an input key and liquid crystal display panel unit formed integrally inside thereof, said input key and liquid crystal display panel unit integrally having input keys and a liquid crystal display panel; and
  said apparatus further comprises electrically connecting means for electrically connecting between said control printed substrate and said input key and liquid crystal display panel unit in a condition where said user interface assembly has been loaded on said card insertion assembly.

19. The card terminal apparatus according to claim 18, wherein:
  said electrically connecting means comprises leaf-spring terminal members, one end of each being fixed on said control printed substrate, the other end of each projecting from said user-interface-assembly loading portion, and terminal members which are provided on said input key and liquid crystal display panel unit; and
  said other end of said leaf-spring terminal members comes into contact with said terminal members provided on said input key and liquid crystal display panel unit, respectively, in the condition where said user interface assembly is loaded on said user-interface-assembly loading portion of said card insertion assembly.

20. The card terminal apparatus according to claim 15, wherein:
  said card insertion assembly has a control printed substrate inside thereof, said control printed substrate including a control circuit, said control printed substrate being provided with first signal transmitting and receiving means;
  said user interface assembly has an input key and liquid crystal display panel unit integrally formed inside thereof, said input key and liquid crystal display panel unit integrally having input keys and a liquid crystal display panel, said input key and liquid crystal display panel unit being provided with second signal transmitting and receiving means; and
  said first signal transmitting and receiving means and said second signal transmitting and receiving means face one another for transmitting and receiving a signal between said control printed substrate and said input key and liquid crystal display panel unit in a condition where said user interface assembly has been loaded on said card insertion assembly.

21. The card terminal apparatus according to claim 15, wherein said user interface assembly has an input key, liquid crystal display panel and control printed substrate unit inside thereof, said input key, liquid crystal panel and control printed substrate unit integrally having input keys, a liquid crystal display panel and a control printed substrate.

* * * * *